J. CHESLER.
ALTERNATING CURRENT RECTIFIER AND RECTIFYING SYSTEM.
APPLICATION FILED JULY 8, 1913.
1,145,116.
Patented July 6, 1915.
2 SHEETS—SHEET 2.
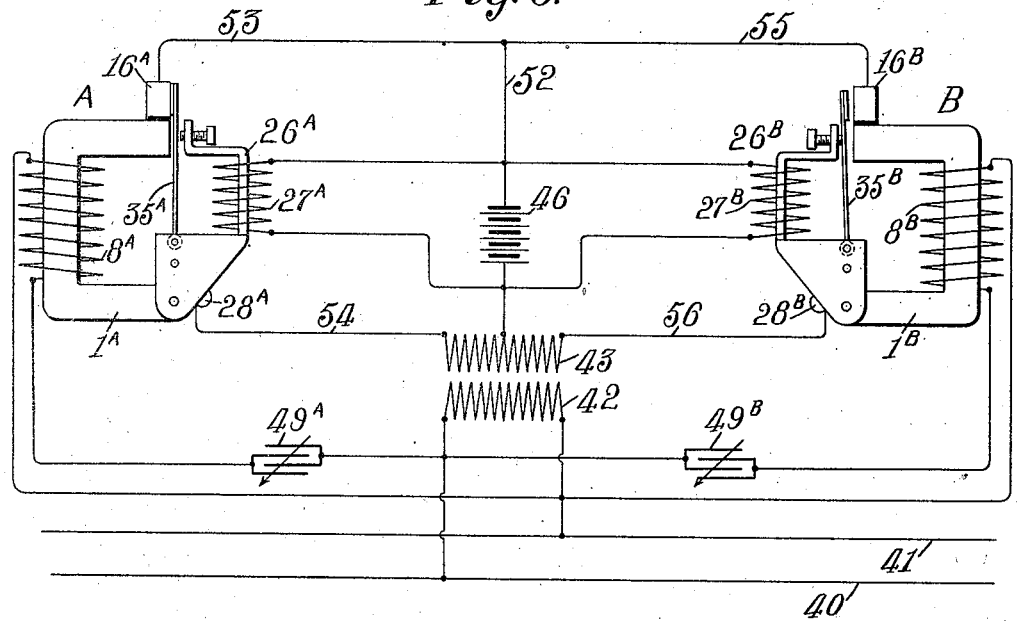
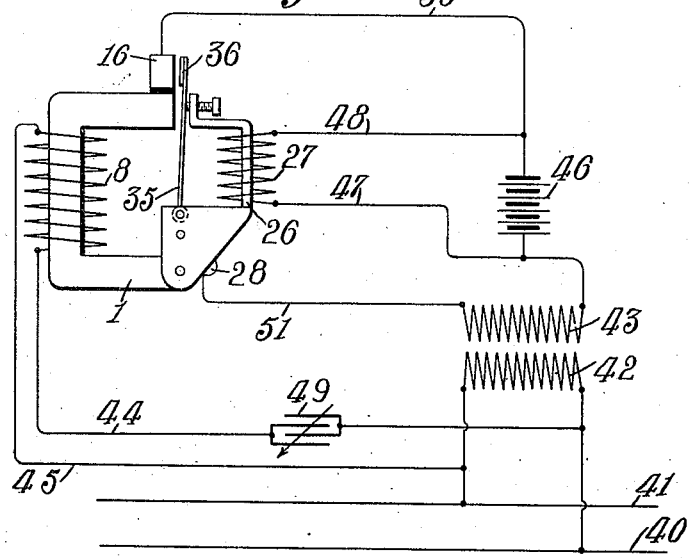
WITNESSES
J. A. Brophy
William A. Hardy.
INVENTOR
Jerry Chesler
BY Dyer + Holden
ATTORNEYS

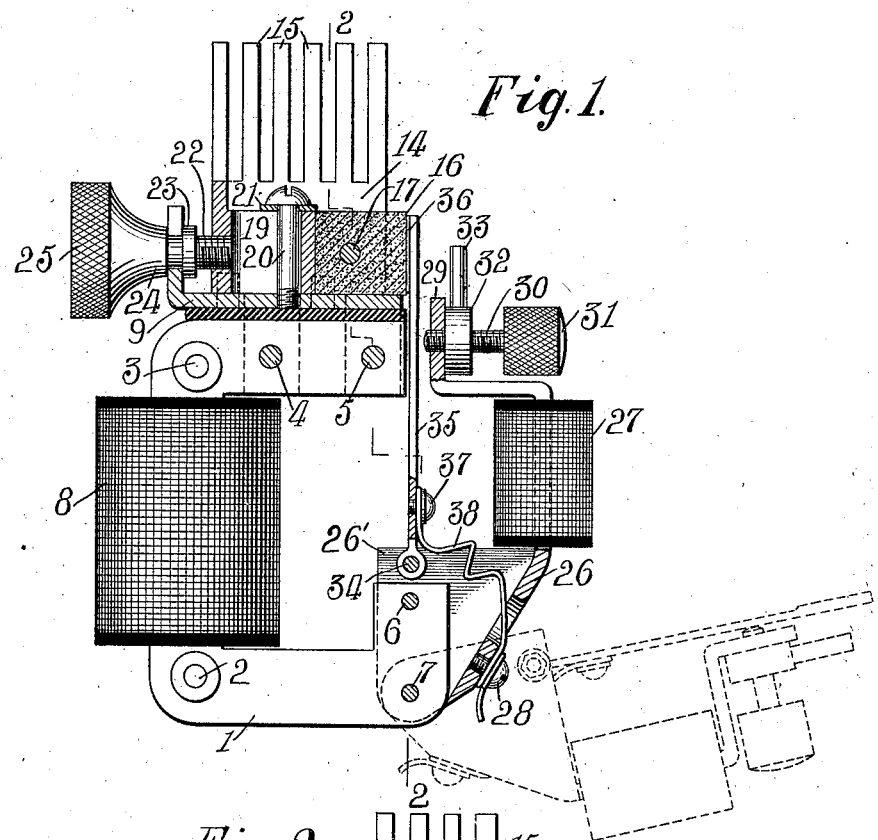
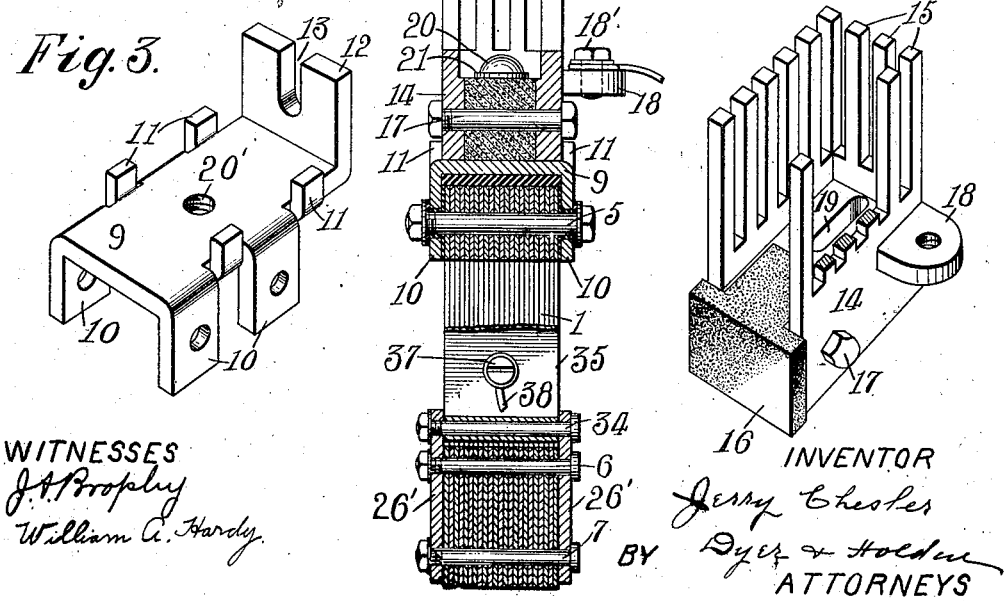

# UNITED STATES PATENT OFFICE.

JERRY CHESLER, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

ALTERNATING-CURRENT RECTIFIER AND RECTIFYING SYSTEM.

1,145,116.   Specification of Letters Patent.   Patented July 6, 1915.

Application filed July 8, 1913. Serial No. 777,807.

*To all whom it may concern:*

Be it known that I, JERRY CHESLER, a subject of the Czar of Russia, and a resident of East Orange, Essex county, New Jersey, have invented certain new and useful Improvements in Alternating-Current Rectifiers and Rectifying Systems, of which the following is a description.

My invention relates to alternating current rectifiers and rectifying systems, and more particularly to that type of such rectifiers in which a vibrating contact or contacts are employed to open and close the circuit or circuits connected to a source of alternating current and to a direct current translating device or devices in such a manner as to cause the current impulses to pass into the direct current translating device or devices in one direction only. My improved rectifying apparatus is especially adapted for use in charging storage batteries and for supplying unidirectional current to electroplating baths.

The principal object of my invention is the provision of an improved simple, durable, efficient and positively acting rectifying device and one which, for the same size of unit, has a greater capacity than rectifiers of a similar character heretofore employed.

Another object of my invention is to provide a rectifier of this type which, in case of failure of current in the alternating current circuit or upon an abnormal drop in voltage in such circuit, will act automatically to open the circuit containing the storage battery or other translating device to be supplied with the direct current, and thereby prevent any back discharge from such storage battery or other translating device, without the employment of auxiliary cut-out switches or similar devices.

My invention consists also in an improved rectifying system, including rectifiers of the type hereinbefore described, and in which both half waves of alternating current are utilized.

Other objects and features of my invention will be hereinafter more fully described and claimed.

In order that my invention may be more clearly understood, reference is hereby made to the drawings which accompany and form a part of this specification, and in which:—

Figure 1 is a side elevation, partly in section, of a rectifying unit constituting one embodiment of my invention. Fig. 2 is a sectional view on the broken line 2—2 of Fig. 1, parts being shown in elevation and parts being omitted. Fig. 3 is a perspective view of a detail of construction. Fig. 4 is a perspective view, partly broken away, of the stationary contact carrying member with the contact mounted therein. Fig. 5 is a diagrammatic view showing one of my improved rectifying units connected in a system for supplying uni-directional current to a storage battery and in which only alternate half waves of alternating current are utilized; and Fig. 6 is a diagrammatic view showing two of my improved rectifying units connected in a system for supplying uni-directional current to a storage battery, and in which both half waves of alternating current are utilized.

Referring particularly to Figs. 1, 2, 3 and 4, at 1 is shown a substantially U-shaped magnetic core made up of soft iron laminæ secured together in any suitable manner, as for example, by the bolts or screws 2, 3, 4, 5, 6 and 7. The middle portion or base of the U-shaped core, which is preferably vertically disposed, is surrounded by a coil 8 composed of a number of turns of wire insulated from each other and from the core in any suitable manner. On the upper horizontal portion or leg of the core 1 is mounted a member 9 which is preferably of non-magnetic material, such as copper or brass, and which is insulated in any suitable manner from the core 1. The member 9 has depending portions 10 embracing the upper horizontal portion or leg of the core 1 and provided with holes through which the screws or bolts 4 and 5 are extended, whereby the member 9 is secured in place upon the core 1, these screws or bolts 4 and 5 being insulated from the portions 10 in any suitable manner. At one end of the member 9 an upturned portion 12 is provided having a vertically extending slot 13. At the sides of the member 9 upturned portions or lugs 11 are provided, which serve as guides for a preferably rectangular contact carrying member 14. Contact carrying member 14 is preferably of non-magnetic material, such as copper or brass, and is provided at its sides and one end with upwardly extending comb-like portions 15 which serve to radiate and dissipate the heat produced at the contacts during the operation of the rectifying device, thereby preventing excessive rise of temperature and reducing the tendency to spark. That end of the contact carrying member 14 opposite the end provided with the comb-like portions 15 has a recess in which is mounted a contact 16 preferably of carbon or graphite, said contact 16 being secured to the member 14 in engagement with the rear wall of the recess therein, in any suitable manner, as for example, by means of a bolt or screw 17, and extending beyond the end of member 14, the extending portion of contact 16 being provided with flanges engaging the adjacent end of member 14. Reference character 18 represents a projection formed on member 14 and having a screw threaded hole therein whereby a conducting wire may be readily connected to said member by means of a binding screw 18'. Member 14 is also provided with a vertically extending slot 19 through which is extended a screw or bolt 20 which is screw threaded into an opening 20' in the member 9, and the head of which coöperates with the washer or cross piece 21 to secure the contact carrying member 14 in adjusted position. In order to facilitate the adjustment of the member 14, a member 22 is provided which is screw threaded into the end of the member 14 opposite the contact 16, and which has a cylindrical reduced portion, formed between shoulders 23 and 24, engaging the slot 13 of the member 9. The member 22 is also provided with a knurled head 25. When the knurled head is turned, the member 22 is prevented from longitudinal movement with respect to the member 9 by shoulders 23 and 24 and its screw threaded portion serves to adjust the contact carrying member 14, and thereby contact 16, by moving the same forward or backward between the guides 11 of the member 9. At the end of the lower leg of the core 1, a core member 26 of soft iron, preferably having a magnetic flux capacity much less than that of core 1, is provided. Member 26 has two vertically extending walls 26' between which the end of the lower leg of the core 1 extends, and this member is hingedly mounted upon the bolt or screw 7 so that it may be easily moved into or out of operative position, its operative position being shown in full lines in Fig. 1 and its inoperative position in dotted lines. The bolt or screw 6 serves as a pin to retain the member 26 in operative position. The core member 26 has a portion surrounded by a coil 27, said coil consisting of a number of turns of wire suitably insulated from each other and from the core member 26. When in operative position, the portion carrying the coil is preferably vertically disposed. Adjacent to its lower end, member 26 is provided with a binding screw 28 for the attachment of conducting wires. A portion of the member 26 above the coil 27 is extended toward the end of the upper leg of core 1 which carries the contact carrying member 14, and has an upwardly extending portion 29 opposite such end of the upper leg of core 1. The upwardly extending portion 29 has screw threaded into it a screw threaded member 30 having a knurled head 31 and on which is mounted a locking member or nut 32 provided with a handle 33 to facilitate the operation thereof.

The core members 1 and 26, with their respective coils 8 and 27, constitute two distinct electromagnets; the coil 8 being adapted to be energized by an alternating current, preferably the alternating current to be rectified, for producing an alternating magnetic flux in one of such magnets, and the coil 27 being adapted to be connected to a source of direct current, preferably the storage battery or other device to be supplied with the rectified current, for producing a magnetic flux of unchanging polarity in the other of such magnets. As above stated, the lower ends of core members 1 and 26 of the magnets are hingedly connected, but, when the magnets are in operative position, as shown in Fig. 1, the upturned portion 29 of core member 26 and the end of the upper leg of core member 1, on which the contact carrying member 14 is mounted, are opposed and slightly spaced apart to form a small air gap. In this gap the soft iron armature 35, elongated and preferably comparatively flat, is located, the said armature 35 being pivotally mounted at its lower end preferably on the pin or bolt 34 which is supported in the core member 26. It will therefore be apparent that armature 35 is common to both of said magnets and will be affected by the magnetic flux of each of them. Armature 35 has a contact portion 36 at its upper end and is so located as to make and break contact with the contact 16 in its vibration. The screw threaded member 30, which is preferably of nonmagnetic material, serves as a back stop for the armature 35. Armature 35 is provided near its pivot with a binding screw 37 to which is attached a conducting wire or "pig-tail" 38, the latter also being attached to core member 26 adjacent the lower end thereof by binding screw 28. As indicated in Fig. 1, the core portion 26 provided with coil 27 and which carries the armature 35 may be swung on its pivot 7, after removing the pin or screw 6, out of operative position in order to enable the operator to examine and clean or adjust the contacts and other parts which are rendered accessible by so swinging the member 26 into inoperative position. It is to be understood that I am not limited to the use of an electromagnet for creating the magnetic flux of unchanging polarity.

Referring to Fig. 5, at 40 and 41 are shown alternating current mains, across which is connected the primary 42 of a transformer. Across the terminals of the primary 42 is connected, by means of conductors 44 and 45, the coil 8 of a rectifying unit, such as has been previously described herein. A storage battery which is to be charged is shown at 46. Across the terminals of the storage battery 46 is connected, by means of conductors 47 and 48, the coil 27 of the rectifying device. The contact 16 of the rectifier is connected by a conductor 50 to one terminal of the storage battery 46, and the other terminal of said storage battery is connected to one terminal of the transformer secondary 43. To the other terminal of the transformer secondary 43 is connected, by conductor 51, binding screw 28 of the rectifier which is electrically connected as hereinbefore described to the armature 35.

The operation of the system illustrated in Fig. 5 is as follows:—The coil 27 is energized by direct current from the battery 46 and consequently the core member 26 is polarized in a constant direction, which, for the purposes of illustration, may be assumed to be such as to produce a north pole at its upper end. The armature 35 forms a part of the magnetic circuit energized by the winding 27 and, under the conditions assumed, the magnetic flux in the magnet comprising core 26 and coil 27 would tend to polarize the upper end of armature 35 as a south pole. The cross section of the iron in the core member 26 and in the armature 35 is preferably small as compared with the cross section of the iron in the core 1, the apparatus being so designed that the core member 26 is magnetically saturated by very little current flowing through coil 27, which may be accomplished by having a large number of turns of wire in the coil 27. There is, therefore, practically no increase in the magnetic flux in the core member 26 when the battery voltage rises to its highest value during charge. The core member 1, being energized by the alternating current in the coil 8, has an alternating magnetic flux produced therein of sufficient value to neutralize and overcome the flux produced in the armature 35 by the magnet comprising core member 26 having the direct current coil 27. When the flux in the core 1 falls to zero, the upper end of armature 35 will be rendered a south pole and attracted by the upper end of the core member 26 which is always magnetized, and thereby the contact between contact portion 36 and contact 16 is broken. If the succeeding half wave of the alternating current is in such a direction as to produce a north pole in the upper end of the core 1, the upper end of the armature 35 will remain of south polarity and the armature will remain in open circuit position, because the air gap between the core 1 and the upper end of the armature 35 is too great to permit the armature 35 to be pulled into contact closing position in opposition to the magnetic effect of the magnet comprising core member 26 and coil 27. The succeeding half wave will render the upper end of the core 1 a south pole and change the polarity of the upper end of the armature 35 from south to north, which will cause the armature 35 to be attracted by the upper end of the core 1 and repelled by the upper end of core member 26 which is always a north pole, and thereby effect the closing of the uni-directional current circuit by the engagement of contact 16 and contact portion 36. As a result, this circuit is closed during every other half wave and remains open during the remaining half waves. When the circuit is closed current flows from the transformer secondary 43 through the battery 46, conductor 50, contact 16, armature 35, binding screw 28, and conductor 51 back to the transformer secondary 43. In this manner unidirectional current is supplied to the battery 46. The function of the adjustable condenser 49 in circuit with the alternating current coil 8 is to advance the phase of the current in the coil in order to compensate for the retardation due to the inductance of the coil 8 and for the inertia of the armature, and to cause the circuit to be broken at the proper times to avoid sparking.

In the system illustrated in Fig. 6, two of my improved rectifying units A and B are employed and both half waves of alternating current are utilized for charging battery 46. In this system the alternating current coils $8^A$ and $8^B$ of the units A and B are each connected across the transformer primary 42 and have in circuit with them adjustable condensers $49^A$ and $49^B$ respectively. The direct current coils $27^A$ and $27^B$ of the units A and B are each connected across the terminals of the battery 46. Contacts $16^A$ and $16^B$, of the units A and B respectively, are each connected to one terminal of the battery 46 by conductor 52 and conductors 53 and 55 respectively, the other terminal of the battery 46 being connected to the middle point of the transformer secondary 43. The terminals of the transformer secondary 43 are connected to the binding screws $28^A$ and $28^B$ of the units A and B respectively by conductors 54 and 56. The operation of the units A and B is the same as that hereinbefore described, but the windings are so arranged and connected with the energizing sources of current that when the battery circuit contacts of unit A are closed the battery circuit contacts of unit B are open and vice versa. This may be accomplished by having the windings 27$^A$ and 27$^B$ produce flux in the same direction, while the windings 8$^A$ and 8$^B$ produce flux in opposite directions at any one time, or by having the windings 8$^A$ and 8$^B$ produce flux in the same direction at any one time, and the windings 27$^A$ and 27$^B$ produce flux in opposite directions. In the system illustrated in Fig. 6, the charging current during one half wave of the alternating current flows over the following circuit:— Starting at the middle point of the transformer secondary 43, through storage battery 46, conductors 52 and 53, stationary contact 16$^A$, armature 35$^A$, binding screw 28$^A$ to the conductor 54 and one terminal of the transformer secondary 43. At this time the battery circuit including the contact 16$^B$ is open and no current flows through this circuit. A half wave later the circuit is as follows:—from the middle point of transformer secondary 43, storage battery 46, conductors 52 and 55, stationary contact 16$^B$, armature 35$^B$, binding screw 28$^B$, to the conductor 56 and the other terminal of transformer secondary 43.

It is immaterial which terminals of the battery are connected to the terminals of my improved rectifying device, inasmuch as the polarity of the battery controls the energization of the direct current coil or coils and insures current being supplied to the battery in the proper direction. Furthermore, in case of failure of current in the alternating current circuit or upon abnormal drop in voltage therein, the battery circuits are automatically opened and there can be no back discharge from the battery. In my improved rectifying device it is unnecessary to employ auxiliary cut-out switches to prevent such back discharge upon such failure of the current or abnormal drop in voltage.

Having now described my invention, what I claim as new and desire to protect by Letters Patent is as follows:—

1. In an alternating current rectifying system, a magnet having a uni-directional flux, an electromagnet, means for producing an alternating magnetic flux therein, a pole of one of said magnets being opposed to and spaced from a pole of the other of said magnets to form an air gap, and a vibratory armature disposed in said air gap, said poles being located at opposite sides of said armature, substantially as described.

2. In an alternating current rectifier, a pair of magnets, the magnetic flux capacity of one of said magnets being substantially greater than that of the other and a pole of one of said magnets being opposed to and spaced from a pole of the other of said magnets to form an air gap, and a vibratory armature disposed in said air gap and included in the magnetic circuit of each of said magnets whereby the polarity of the armature will be changed in accordance with the changes of polarity in the magnet having the greater flux capacity, substantially as described.

3. In an alternating current rectifier, a pair of magnets, one of which comprises a core member having a direct current winding and the other of which comprises a core member having an alternating current winding, a pole of one of said magnets being opposed to and spaced from a pole of the other of said magnets to form an air gap, and a vibratory armature disposed in said air gap, said poles being located at opposite sides of said armature, substantially as described.

4. In an alternating current rectifier, a pair of magnets, one of said magnets having a pole of constant polarity, means for changing the polarity of a pole of the other of said magnets in synchronism with the alternations in the alternating current, said poles being opposed to and spaced from each other to form an air gap, and a vibratory armature disposed in said air gap, said poles being located at opposite sides of said armature, substantially as described.

5. In an alternating current rectifier, a pair of magnets hingedly connected for movement to and from operative position, a pole of one of said magnets being opposed to and spaced from a pole of the other of said magnets, when the magnets are in operative position, to form an air gap, and a vibratory armature disposed in said air gap, substantially as described.

6. In an alternating current rectifier, a pair of magnets hingedly connected for movement to and from operative position, a pole of one of said magnets being opposed to and spaced from a pole of the other of said magnets, when the magnets are in operative position, to form an air gap, and a vibratory armature pivotally mounted on one of said magnets and disposed in said air gap, substantially as described.

7. In an alternating current rectifying system, a pair of magnets hingedly connected for movement to and from operative position, one of said magnets having a constant uni-directional flux, means for producing an alternating magnetic flux in the other of said magnets, a pole of one of said magnets being opposed to and spaced from a pole of the other of said magnets, when the latter are in operative position, to form an air gap, and a vibratory armature pivotally mounted on one of said magnets and disposed in said air gap, said poles being located at opposite sides of said armature, substantially as described.

8. In an alternating current rectifier, a pair of magnets hingedly connected for movement to and from operative position, the magnetic flux capacity of one of said magnets being substantially greater than that of the other and a pole of one of said magnets being opposed to and spaced from a pole of the other of said magnets, when the latter are in operative position, to form an air gap, and a vibratory armature pivotally mounted on the magnet having the lesser flux capacity and disposed in said air gap, whereby said armature is included in the magnetic circuit of each of said magnets and the polarity of the armature will be changed in accordance with the changes in the polarity of the magnet having the greater flux capacity, substantially as described.

9. In an alternating current rectifying system, an electromagnet, means for producing a uni-directional magnetic flux therein, an electromagnet having a flux capacity substantially greater than that of the first magnet, means for producing an alternating magnetic flux therein, one of said magnets being provided with a pole opposed to and spaced from a pole of the other magnet to form an air gap, and a vibratory armature disposed in said air gap, and included in the magnetic circuit of each of said magnets whereby the polarity of the armature will be changed in accordance with the changes of polarity in the magnet having the greater flux capacity, substantially as described.

10. In an alternating current rectifier, a magnet of unchanging polarity, an electromagnet adapted to be energized by alternating current for producing an alternating flux therein, said magnets being provided with a pair of opposed and spaced poles to form an air gap, a stationary contact carried by and insulated from the electromagnet, and a vibratory armature disposed in said air gap, said poles being located on opposite sides of said armature, said armature having a contact portion adapted to coöperate with said stationary contact for making and breaking a circuit, substantially as described.

11. In an alternating current rectifier, a contact carrying member comprising a substantially rectangular member provided with a recess in one end adapted to receive a contact, and comb-like portions, extending from its sides and the end thereof opposite that end provided with the recess, for radiating and dissipating heat, substantially as described.

12. In an alternating current rectifier, a substantially rectangular contact carrier provided with comb-like heat radiating and dissipating portions extending from the sides and one end thereof and provided with a recess in the other end thereof, and a carbon contact removably mounted in said recess in engagement with the rear wall thereof and extending beyond the end of said carrier, substantially as described.

13. In an alternating current rectifier, a pair of magnets provided with a pair of adjacent poles spaced to form an air gap, a vibratory armature disposed in said air gap, a non-magnetic stop for said armature adjustably mounted in one of said poles, and a stationary contact adjustably mounted on and insulated from the other of said poles, said armature being provided with a contact portion adapted to coöperate with said stationary contact for making and breaking a circuit, substantially as described.

14. In an alternating current rectifier, a magnet having a small flux capacity and of constant polarity, an electromagnet having a relatively large flux capacity and adapted to be energized by the alternating current, and means for making and breaking a circuit comprising a vibratory armature provided with a contact portion and included in the magnetic circuit of each of said magnets whereby the polarity of the armature is changed in accordance with the changes of polarity in the magnet of large flux capacity, substantially as described.

15. In an alternating current rectifying system, a pair of electromagnets, a pole of one of said magnets being opposed to and spaced from a pole of the other of said magnets to form an air gap, a vibratory armature, having a contact portion for opening and closing a circuit, disposed in said air gap, said magnets having different magnetic flux capacities, means for producing an alternating magnetic flux in the magnet having the greater flux capacity, and means for producing a uni-directional magnetic flux in the other of said magnets, whereby said armature will be vibrated between said opposed poles and whereby when the magnet having the greater flux capacity is deënergized, the armature will be held by the other magnet in open circuit position, said poles each being provided with means which are alternately engaged by the armature in its vibration, substantially as described.

16. In an alternating current rectifier, an electromagnet adapted to be energized by alternating current for producing an alternating magnetic flux therein, said magnet having a U-shaped core, a magnet of unchanging polarity hinged to one leg of said core, and a vibratory armature disposed between said magnets, said poles each being provided with means which are alternately engaged by the armature in its vibration, substantially as described.

17. In an alternating current rectifying system, an electromagnet, means for producing an alternating magnetic flux therein, said magnet having a U-shaped core, a magnet of unchanging polarity hinged to one leg of said core, and a vibratory armature disposed between said magnets and pivotally mounted at one end on said second magnet, substantially as described.

18. In an alternating current rectifier, a U-shaped member of magnetic material, the base of the U-shaped member being provided with an alternating current coil, a member of magnetic material hinged at one end to one leg of said U-shaped member and provided with a direct current coil, and a vibratory armature disposed between the other ends of said members, substantially as described.

19. In an alternating current rectifier, a U-shaped member of magnetic material, the base of the U-shaped member being provided with an alternating current coil, a member of magnetic material hinged at one end to one leg of said U-shaped member and provided with a direct current coil, and a vibratory armature disposed between the other ends of said members, said armature being pivotally mounted at one end on the member provided with the direct current coil adjacent its hinged connection with the U-shaped member, substantially as described.

20. In a device of the class described, a core portion having a contact mounted thereon, a vibratory armature having a contact portion adapted to coöperate with said contact, and a second core portion connected with said first core portion for movement toward and away from said contact, substantially as described.

21. In a device of the class described, a core portion having a contact mounted thereon, a vibratory armature having a contact portion adapted to coöperate with said contact, and a second core portion connected with said first core portion for movement toward and away from said contact, said armature being mounted on said second core portion, substantially as described.

22. In a device of the class described, a core portion having a contact mounted thereon, a vibratory armature having a contact portion adapted to coöperate with said contact, and a second core portion hingedly connected with said first core portion for movement toward and away from said contact, substantially as described.

23. In a device of the class described, a core portion having a contact mounted thereon, an armature having a contact portion adapted to coöperate with said contact, and a second core portion connected with said first core portion for movement toward and away from said contact, said armature being pivotally mounted on said second core portion, substantially as described.

24. In an alternating current rectifying system, a source of alternating current, a source of uni-directional electromotive force, connections between said sources including parallel circuits, each of said parallel circuits having therein a fixed contact and a vibratory contact, coöperating therewith, and means for opening and closing said contacts in one of said circuits and for simultaneously closing and opening said contacts in the other of said circuits in synchronism with the alternations of the alternating current, said means comprising an electromagnet for each of said circuits, the terminals of a coil of each of which magnets are connected to said source of uni-directional electromotive force at points of different potential, substantially as described.

25. In an alternating current rectifying system, a source of alternating current, a source of uni-directional electromotive force, connections between said sources including a pair of parallel circuits, each of said circuits having therein a fixed contact and a vibratory contact coöperating therewith, and means for opening and closing said contacts in one of said circuits and for simultaneously closing and opening said contacts in the other of said circuits in synchronism with the alternations of the alternating current, said means comprising two pairs of electromagnets, a magnet of each pair for each of said circuits, the coils of one of said pairs of magnets being connected to and energized by said source of uni-directional electromotive force, and the coils of the other of said pairs of magnets being connected to and energized by the source of alternating current, one of said pairs of magnets being wound and connected for simultaneously producing therein fluxes in the same direction, and the other of said pairs of magnets being wound and connected for simultaneously producing therein fluxes in opposite directions, substantially as described.

26. In an alternating current rectifying system, an electro-magnet, means for producing an alternating magnetic flux therein, a magnet of unchanging polarity hinged to said electro-magnet, and a vibratory armature disposed between said magnets and pivotally mounted at one end on one of said magnets, substantially as described.

This specification signed and witnessed this 7th day of July 1913.

JERRY CHESLER.

Witnesses:
WILLIAM A. HARDY,
MARY J. LAIDLAW.